United States Patent
Chen et al.

(10) Patent No.: US 9,247,097 B2
(45) Date of Patent: Jan. 26, 2016

(54) MULTI-PURPOSE SCANNER

(71) Applicant: AVISION INC., Hsinchu (TW)

(72) Inventors: Chi-Yao Chen, Nanjhuang Township, Miaoli County (TW); Jui Cheng Liu, Nantou (TW); Chao Yu Peng, Hsinchu (TW)

(73) Assignee: Avision Inc. (TW)

( * ) Notice: Subject to any disclaimer, the term of this patent is extended or adjusted under 35 U.S.C. 154(b) by 0 days.

(21) Appl. No.: 14/263,209

(22) Filed: Apr. 28, 2014

(65) Prior Publication Data

US 2015/0256704 A1    Sep. 10, 2015

(30) Foreign Application Priority Data

Mar. 10, 2014 (TW) .............................. 103108068 A

(51) Int. Cl.
| | |
|---|---|
| *H04N 1/04* | (2006.01) |
| *H04N 1/203* | (2006.01) |
| *H04N 1/00* | (2006.01) |
| *H04N 1/12* | (2006.01) |
| *H04N 1/028* | (2006.01) |

(52) U.S. Cl.
CPC ......... *H04N 1/2038* (2013.01); *H04N 1/00525* (2013.01); *H04N 1/00716* (2013.01); *H04N 1/00827* (2013.01); *H04N 1/02815* (2013.01); *H04N 1/121* (2013.01); *H04N 1/123* (2013.01); *H04N 1/2032* (2013.01); *H04N 1/2036* (2013.01); *H04N 2201/0434* (2013.01)

(58) Field of Classification Search
CPC ............ H04N 1/2038; H04N 1/00525; H04N 1/00716; H04N 1/00827; H04N 1/02815
See application file for complete search history.

(56) References Cited

U.S. PATENT DOCUMENTS

| | | | | |
|---|---|---|---|---|
| 6,580,526 B1 * | 6/2003 | Suzuki et al. | ................. | 358/473 |
| 7,551,332 B2 * | 6/2009 | Itoi | ............................. | 358/497 |
| 7,636,182 B2 * | 12/2009 | Guo | ............................. | 358/497 |

* cited by examiner

*Primary Examiner* — Cheukfan Lee

(57) ABSTRACT

A multi-purpose scanner comprises a first body, a second body and a scanning module. The second body is disposed on the first body. A first passageway and a second passageway, which are for accommodating a first portion and a second portion of an angled document, and are disposed on a first plane and a second plane, respectively, are formed between the first body and the second body. An included angle is formed between the first plane and the second plane. The scanning module, disposed in the first body and/or the second body, performs an image scan operation on the first portion of the angled document in the first passageway to obtain an image signal.

18 Claims, 10 Drawing Sheets

MULTI-PURPOSE SCANNER

This application claims priority of No. 103108068 filed in Taiwan R.O.C. on Mar. 10, 2014 under 35 USC 119, the entire content of which is hereby incorporated by reference.

BACKGROUND OF THE INVENTION

1. Field of the Invention

The present invention relates in general to a scanner, and more particularly to a simplex or duplex multi-purpose scanner capable of scanning an ordinary document and a bound document (or even any other angled document).

2. Related Art

In general, when a bound document, such as a passport, book or the like, is to be scanned, the bound document cannot be transported past a sheet-fed scanner because the left and right sides of the bound document have different thicknesses, or due to the book back or binding mode. So, a flatbed scanner must be utilized to acquire the document image. However, the drawback of the flatbed scanner is that the flatbed scanner cannot scan both sides of the bound document at the same time. So, the user has to turn over the bound document to re-scan the document, and this is time-consuming and not user friendly.

On the other hand, credentials, such as passports and identification cards, often have to be scanned at the government organization, such as customhouse, for the immigration registration. If the flatbed scanner for scanning the passport is used to scan both sides of the credential, two scan operations have to be performed. If the sheet-fed scanner is to be purchased in order to scan the credential quickly, the cost is high and the sheet-fed scanner occupies an additional space, which is disadvantageous to the limited office environment.

SUMMARY OF THE INVENTION

Accordingly, the present invention has been proposed to solve the problems of the prior art, and it is an object of the present invention to provide a multi-purpose scanner capable of performing a simplex scan or even a duplex scan on a bound document (or even any other angled document) and an ordinary document to establish a convenient, rapid and user friendly scan environment, save the cost for purchasing different types of scanners, save the cost and provide multiple functions.

To achieve the above-identified object, the present invention provides a multi-purpose scanner comprising a first body, a second body and a scanning module. The second body is disposed on the first body. A first passageway and a second passageway, which are for accommodating a first portion and a second portion of an angled document, and are disposed on a first plane and a second plane, respectively, are formed between the first body and the second body. An included angle is formed between the first plane and the second plane. The scanning module is disposed on one or both of the first body and the second body, and performs an image scan operation on the first portion of the angled document in the first passageway to obtain an image signal.

The multi-purpose scanner is different from frequently seen flatbed scanners, can transport the angled document, such as a passport, to perform the simplex or duplex scan. In addition, it is unnecessary to flatten the angled document or even deform the angled document in the scan operation. The user can perform the image scan using his/her single hand to place the document. Because the scanning module can be disposed as close to the second passageway as possible, the zero margin can be obtained so that the scan range is enlarged and the scan result near the angled portion is clear. Furthermore, the limit devices are provided on left and right sides of the document, so that the scanned document can be positioned more easily, and the usage is clear and simple. In addition, when the passport is scanned, the passport stands in an L-shaped manner, and the rollers transport the passport to perform the scan. This is easier and more laborsaving than turning over and flattening the passport on the scan platen. In addition, when the multi-purpose scanner is configured as a passport dedicated scanner, the overall size is smaller than that of the typical flatbed scanner, and the weight is also decreased, so that the scanner can be made portable.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

The present invention will be apparent from the following detailed description, which proceeds with reference to the accompanying drawings.

The multi-purpose scanner according to each embodiment of the present invention may be a flatbed scanner, a sheet-fed scanner or a combination of the flatbed scanner and the sheet-fed scanner. In addition, the multi-purpose scanner may be a simplex scanner or a duplex scanner. Furthermore, the multi-purpose scanner may be a visible light scanner, an ultra-violet light scanner, an infrared scanner or a combination thereof.

Thus, various elements described in the following can be applied to the embodiments when no conflict occurs.

Figure 1:
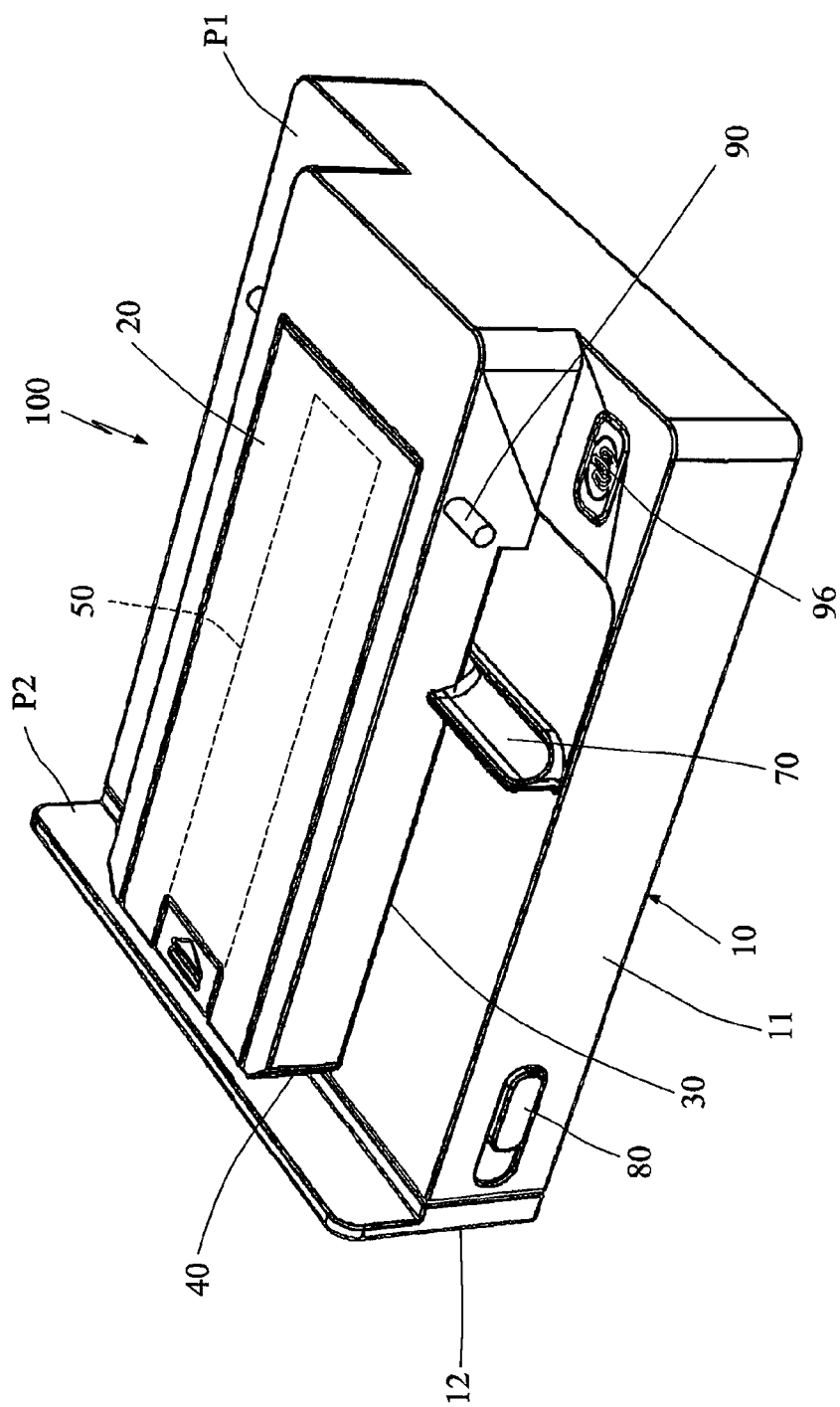
FIG. 1 shows a pictorial view of a multi-purpose scanner according to a first embodiment of the present invention.
Figure 2:
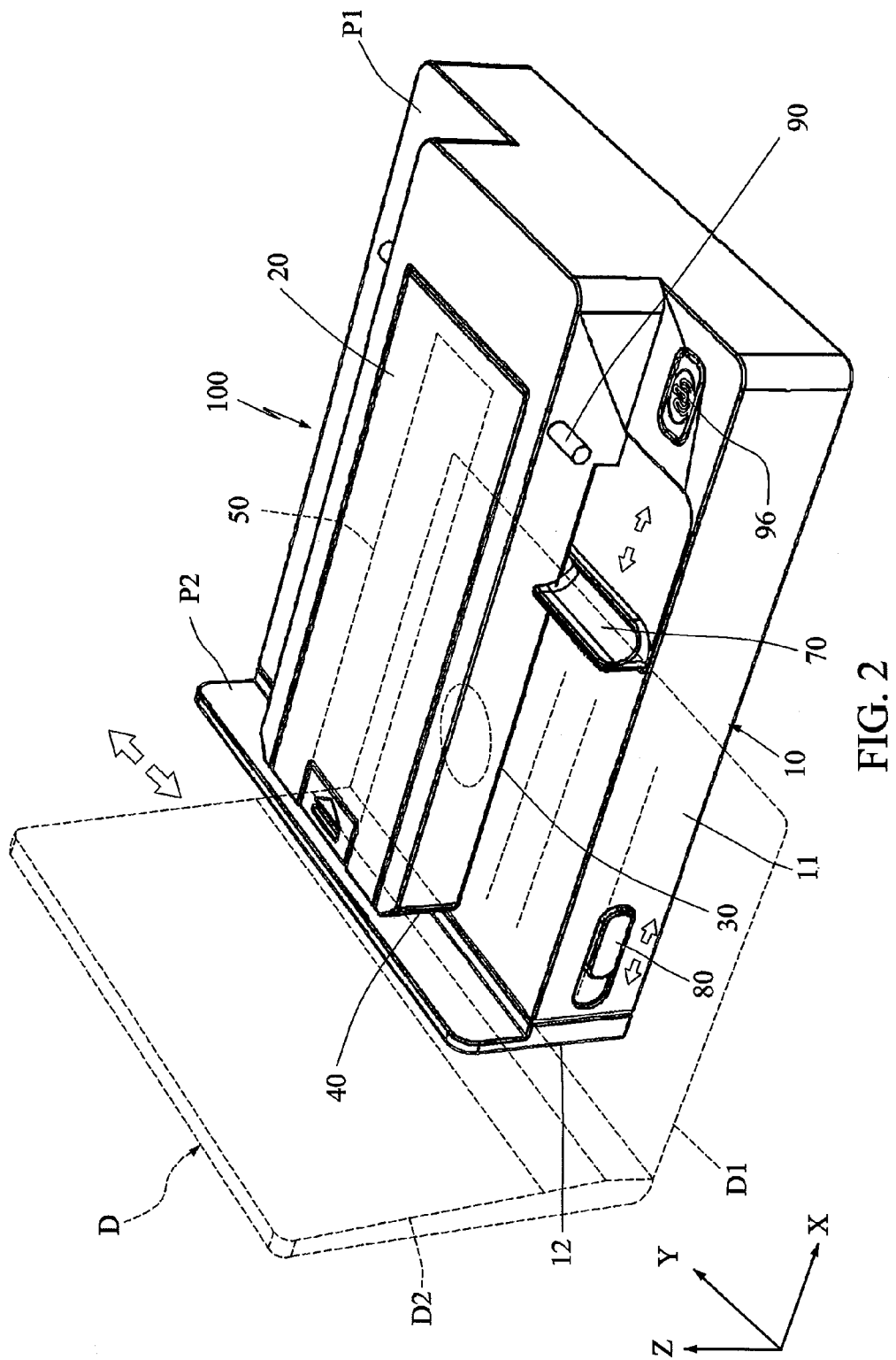
FIG. 2 shows a pictorial view of a using state of the multi-purpose scanner according to the first embodiment of the present invention.
Figure 3:
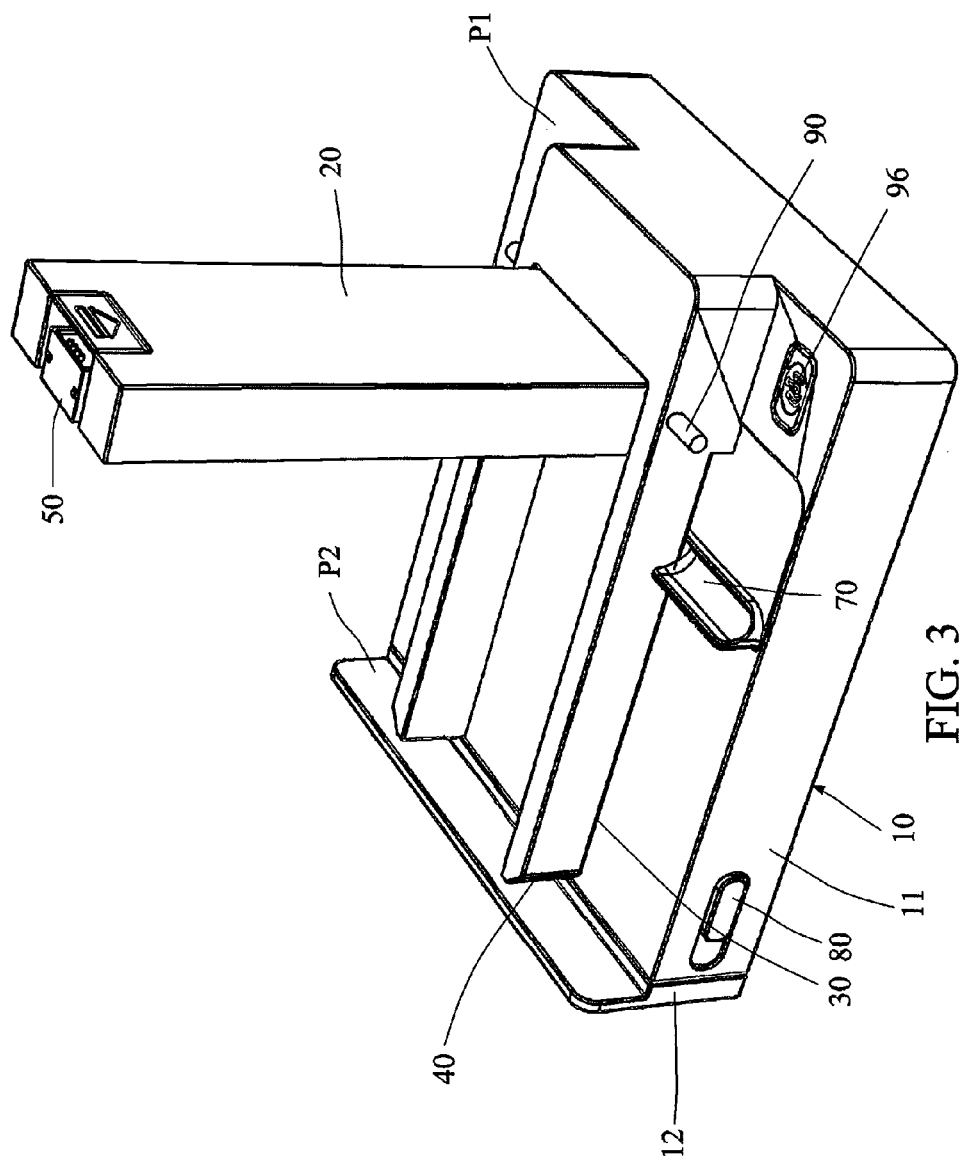
FIG. 3 shows a pictorial view of a maintaining state of the multi-purpose scanner according to the first embodiment of the present invention.
Figure 4:
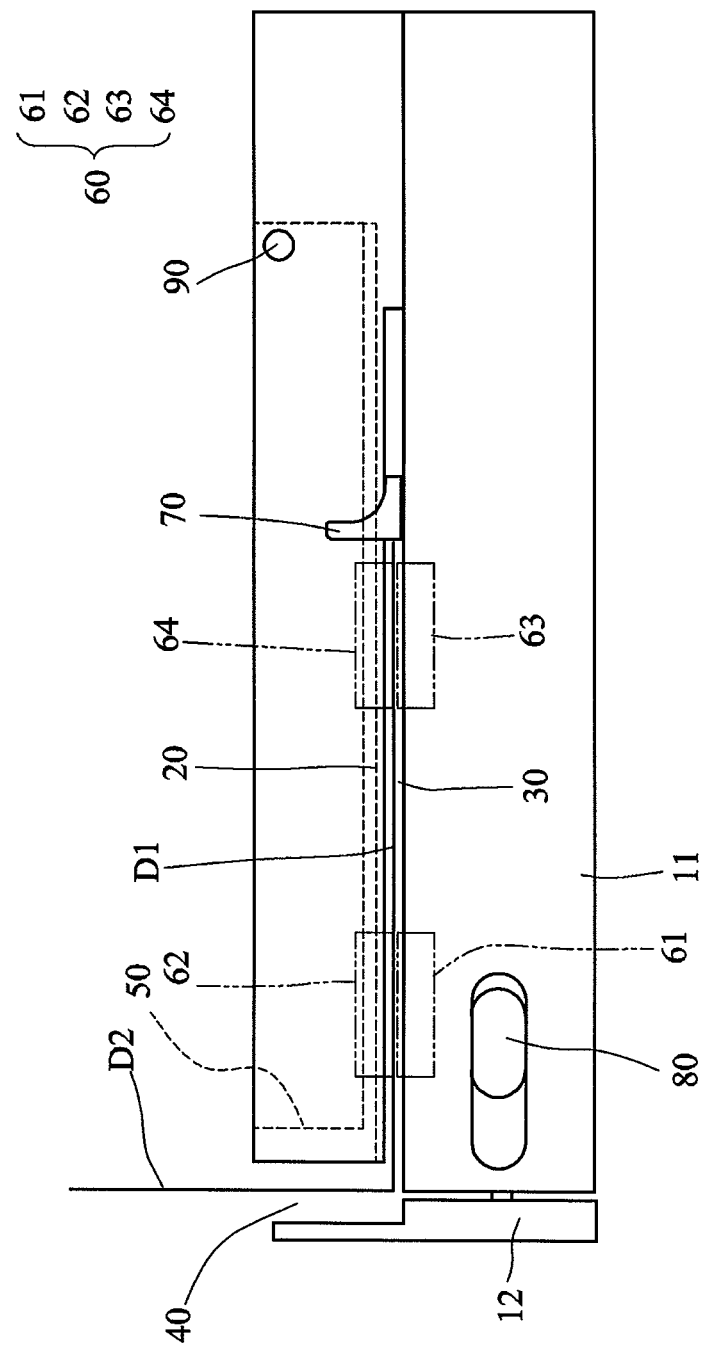
FIG. 4 shows a schematic side view of the multi-purpose scanner according to the first embodiment of the present invention.

FIG. 1 shows a pictorial view of a multi-purpose scanner 100 according to a first embodiment of the present invention. FIGS. 2 and 3 show pictorial views of a using state and a maintaining state of the multi-purpose scanner 100 according to the first embodiment of the present invention, wherein FIG. 2 shows coordinate axes X, Y and Z. FIG. 4 shows a schematic side view of the multi-purpose scanner 100 according to the first embodiment of the present invention. Referring to FIGS. 1 to 4, the multi-purpose scanner 100 of this embodiment comprises a first body 10, a second body 20 and a scanning module 50. In addition, the multi-purpose scanner 100 may further comprise a transporting mechanism 60, a width-adjustable guide plate 70, a thickness adjusting mechanism 80 and a pivotally connecting mechanism 90.

The second body 20 is disposed on the first body 10. A first passageway 30 and a second passageway 40, which are for accommodating a first portion D1 and a second portion D2 of an angled document D, respectively, are formed between the first body 10 and the second body 20. The first passageway 30 and the second passageway 40 are disposed on a first plane P1 and a second plane P2, respectively. An included angle between the first plane P1 and the second plane P2 ranges from 10 to 180 degrees. In this non-restrictive embodiment, the included angle is about 90 degrees, the first plane P1 is parallel to the XY plane, and the second plane P2 is parallel to the YZ plane. The included angle ranges from 10 to 170 degrees in another example, and ranges from 20 to 160 degrees in still another example.

The angled document D is transported past the scanning module 50 in the Y direction, and the main to-be-scanned surface (the surface with texts or patterns) of the angled document D faces upwards. The first passageway 30 positions the angled document D, and the second passageway 40 allows the angled document D to partially accommodate therein or allows the angled document D to move therein, or even can assist in positioning the angled document D. The angled document D comprises, without limitation to, a bound document, a bent card, or the like.

In this embodiment, the scanning module 50 is disposed in the second body 20. However, it is to be noted that in another embodiment of the present invention, the scanning module 50 may be disposed in the second body 20 and the first body 10, or may be solely disposed in the first body 10. Therefore, the scanning module 50 is disposed in the first body 10 and/or the second body 20, and performs an image scan operation on the first portion D1 of the angled document D in the first passageway 30 to obtain an image signal. In this embodiment, the scanning module 50 is disposed in the second body 20 and downwardly scans the first portion D1 of the angled document D. Furthermore, the scanning module 50 may be configured as a cantilever-arm type floating structure capable of floating up and down relatively to the second body 20 or the first body 10 to adaptively adjust the height of the first passageway 30 corresponding to the thickness of the first portion D1 of the angled document D. In the design of the cantilever-arm type floating structure, a spring may be used to push the scanning module 50 downwards, and the weight of the scanning module 50 may cause the scanning module 50 to press against the document. The scanning module 50 may be a charge-coupled device (CCD) type image sensor scanning module, or a contact image sensor (CIS) scanning module.

The first body 10 is usually a base or a casing, in which the necessary mechanisms, driving members, electrical elements and the like are disposed. For example, a button 96 is disposed on the first body 10, and the user can press the button 96 to perform the scan operation. In another example, a touch screen (not shown) is disposed on the first body 10 to provide display and input functions for the user.

In this embodiment, the first body 10 comprises a first portion 11 and a second portion 12. The first portion 11 and the second portion 12 are retractable relative to each other. The thickness adjusting mechanism 80 is connected to the first portion 11 and the second portion 12 of the first body 10, and can adjust the thickness of the second passageway 40 to fit with the thickness of the second portion D2 of the angled document D.

The transporting mechanism 60 is disposed in the first body 10 and the second body 20, and is for transporting the angled document D past the first passageway 30. In this embodiment, rollers 61, 62, 63 and 64 function as the transporting mechanism 60.

The width-adjustable guide plate 70 is connected to the first passageway 30 and pushes the first portion D1 of the angled document D toward the second passageway 40 to prevent the skew of the angled document D.

The pivotally connecting mechanism 90 pivotally connects the second body 20 to the first body 10. The scanning module 50 is disposed in the second body 20. Thus, as shown in FIG. 3, when the second body 20 is lifted up, the scanning module 50 is also lifted up therewith, and the user can perform the clean or maintenance operations on the scanning module 50 advantageously. Moreover, the user can replace the scanning module 50 with another scanning module for a different scan requirement, such as the high resolution scan, low resolution scan, monochromatic scan, color scan or the like.

Figure 5:
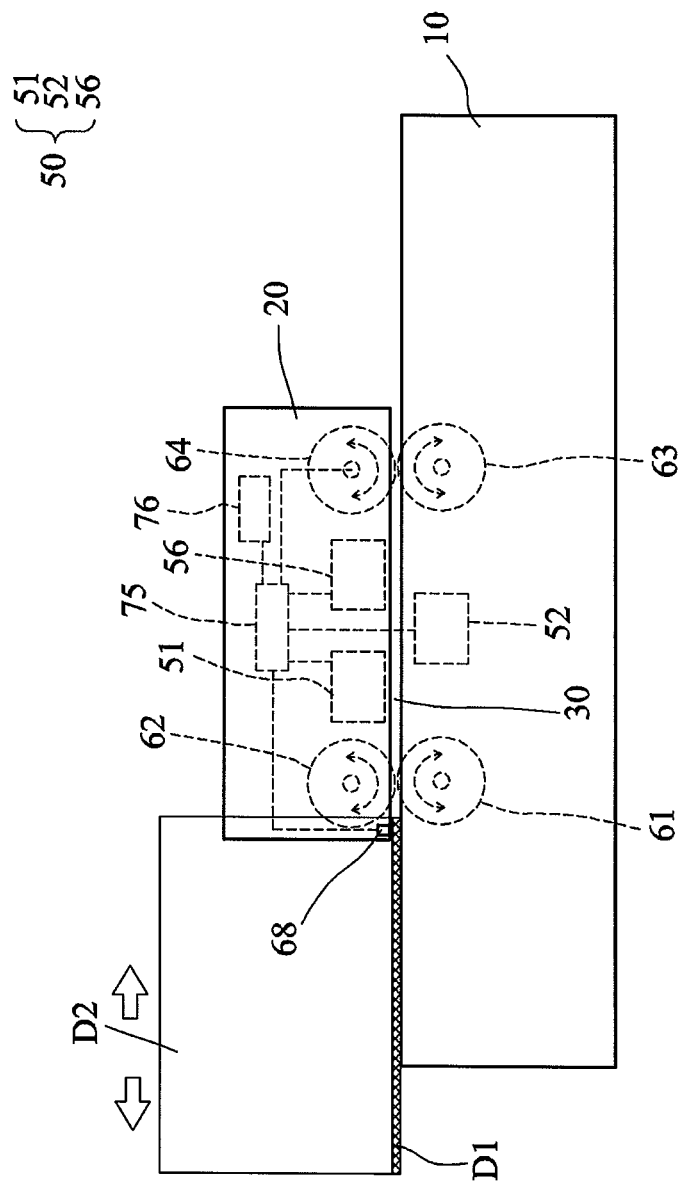
FIG. 5 shows a schematic from view of a multi-purpose scanner according to a second embodiment of the present invention.

FIG. 5 shows a schematic from view of a multi-purpose scanner according to a second embodiment of the present invention. Referring to FIG. 5, the scanning module 50 comprises a first scanning unit 51, a second scanning unit 52 and a third scanning unit 56. The first scanning unit 51 and the second scanning unit 52 are disposed in the second body 20 and the first body 10, and downwardly and upwardly scan the front side and the back side of the first portion D1 of the angled document D, respectively. The first scanning unit 51 and the second scanning unit 52 are visible light scanning units. The third scanning unit 56 is an infrared or ultra-violet light scanning unit. The first scanning unit 51 and the third scanning unit 56 downwardly scan the first portion D1 of the angled document D to obtain a visible light image and an infrared or ultra-violet light image.

In addition, the multi-purpose scanner 100 further comprises a control module 75, which is electrically connected to the first scanning unit 51, the second scanning unit 52, the third scanning unit 56 and the transporting mechanism 60, and controls the first scanning unit 51 and the third scanning unit 56 to scan the front side of the first portion D1 of the angled document D concurrently or in a scan pass. Thus, the visible light image and the infrared or ultra-violet light image may be obtained, so that the truth or false determination can be performed according to the infrared or ultra-violet light image. In another embodiment, the control module 75 controls the transporting mechanism 60 to transport the angled document D from a first side (near the user) to a second side (away from the user), and controls the first scanning unit 51 to scan the first portion D1 of the angled document D with the visible light, and then the control module 75 controls the transporting mechanism 60 to transport the angled document D from the second side to the first side, and controls the third scanning unit 56 to scan the first portion D1 of the angled document D with the infrared or ultra-violet light. The order of the visible light scan and the infrared/ultra-violet light scan can be modified according to the requirement. Thus, the interference, caused by the visible light and infrared/ultra-violet light working concurrently, can be avoided, and the signal processing may also become easier. That is, the control module 75 controls the visible light scanning unit 51 and the infrared or ultra-violet light scanning unit 56 to scan the first portion D1 of the angled document D, transported by the transporting mechanism 60 in reverse directions, respectively. In this embodiment, the user needs not to stretch his/ her hand to the second side, and can easily obtain the scan image and take back the angled document D by only placing the angled document D at the closest first side. In addition, the multi-purpose scanner 100 may further comprise a wireless transceiver module 76, electrically connected to the control module 75, for transmitting the scan image signal to a server or a cloud database. Furthermore, the multi-purpose scanner 100 may further comprise a document detector 68, disposed beside the first passageway 30 and electrically connected to the control module 75. Upon detection of the angled document D, the control module 75 enables the transporting mechanism 60 to automatically feed the angled document D into the first passageway 30 so that the scan can be performed.

It is to be noted that the multi-purpose scanner of the present invention is not restricted to only the scan of the angled document. An ordinary document with a suitable size may also be placed on the first plane P1 and scanned by the multi-purpose scanner of the present invention. The user can adjust the width-adjustable guide plate 70 to a suitable width so that the documents with different sizes can be placed and scanned.

Figure 6:
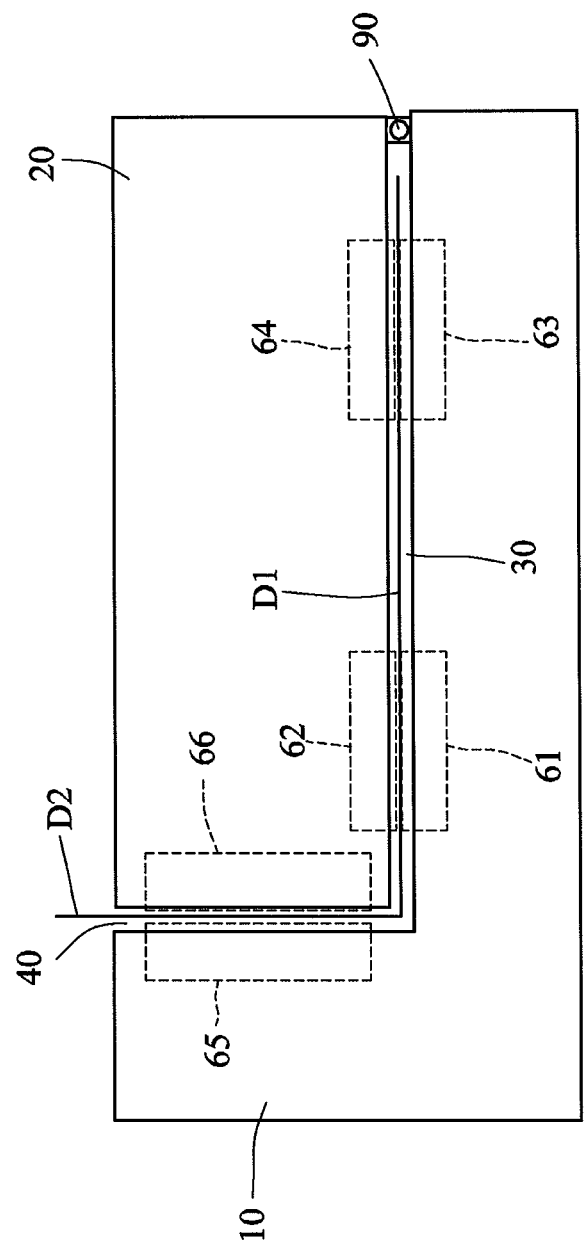
FIG. 6 shows a schematic side view of a multi-purpose scanner according to a third embodiment of the present invention.

FIG. 6 shows a schematic side view of a multi-purpose scanner according to a third embodiment of the present invention. As shown in FIG. 6, this embodiment is similar to the first embodiment except that rollers 65 and 66 for transporting the second portion D2 of the angled document D are also disposed on the second passageway 40. Thus, the angled document can be transported more stably. It is to be noted that the rollers 61 to 64 may also be omitted in this embodiment, and the effect of transporting the angled document D still can be obtained.

Figure 7:
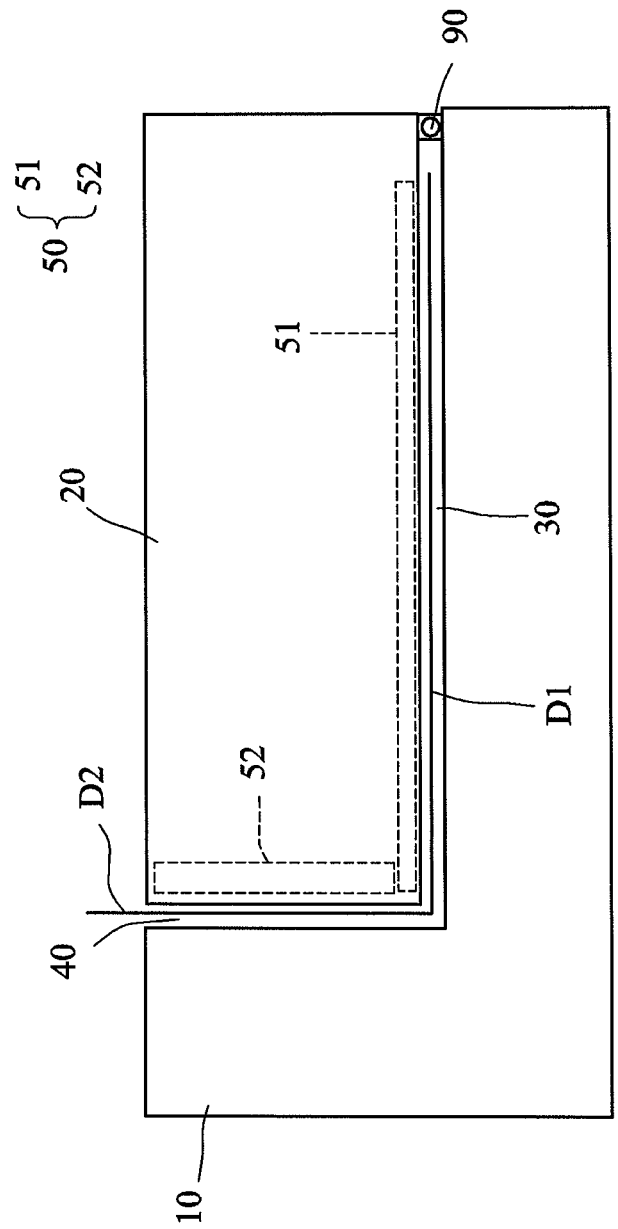
FIG. 7 shows a schematic side view of a multi-purpose scanner according to a fourth embodiment of the present invention.

FIG. 7 shows a schematic side view of a multi-purpose scanner according to a fourth embodiment of the present invention. As shown in FIG. 7, this embodiment is similar to the first embodiment except that the first scanning unit 51 and the second scanning unit 52 for scanning the first portion D1 and the second portion D2 of the angled document D, respectively, are disposed in the second body 20. Thus, two pages of the angled document D can be scanned at the same time rapidly.

Figure 8:
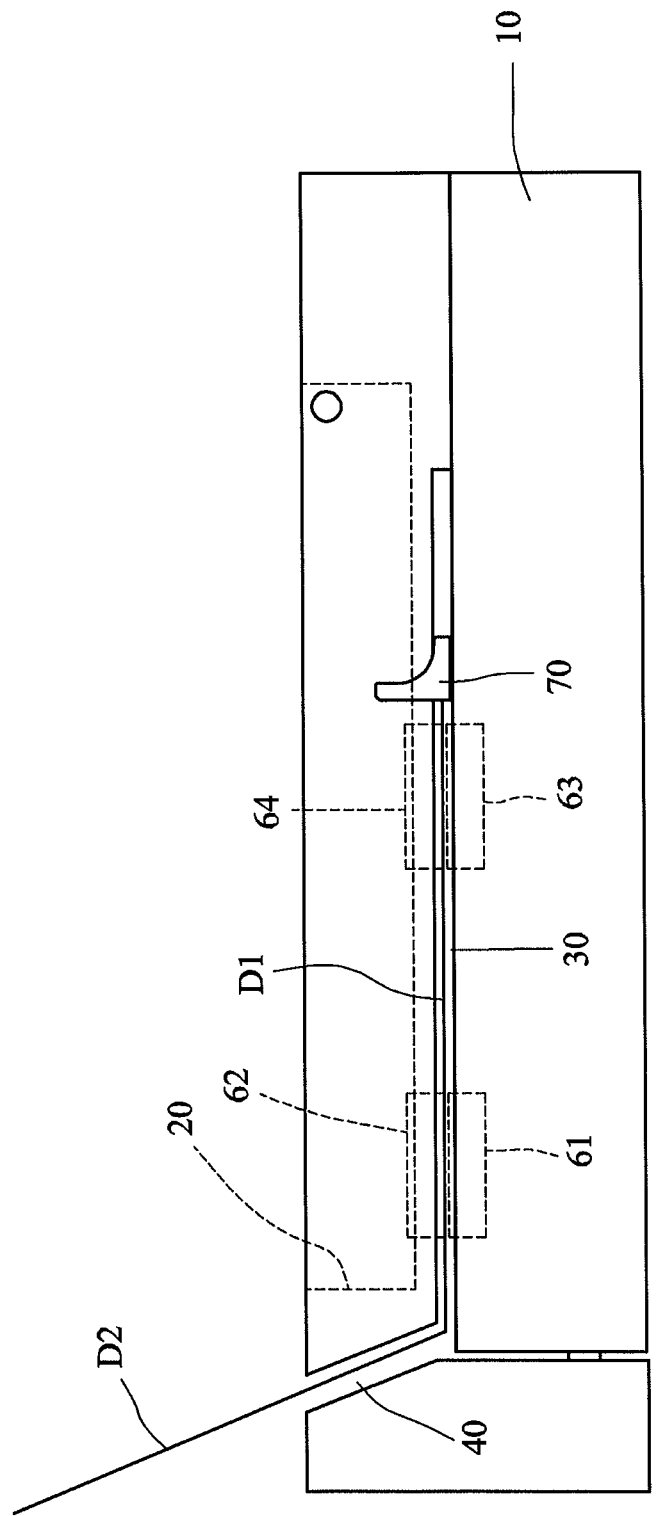
FIG. 8 shows a schematic side view of a multi-purpose scanner according to a fifth embodiment of the present invention.

FIG. 8 shows a schematic side view of a multi-purpose scanner according to a fifth embodiment of the present invention. As shown in FIG. 8, this embodiment is similar to the first embodiment except that the included angle between the first passageway 30 and the second passageway 40 is greater than 90 degrees. Thus, the effect the same as the first embodiment may also be obtained.

Figure 9:
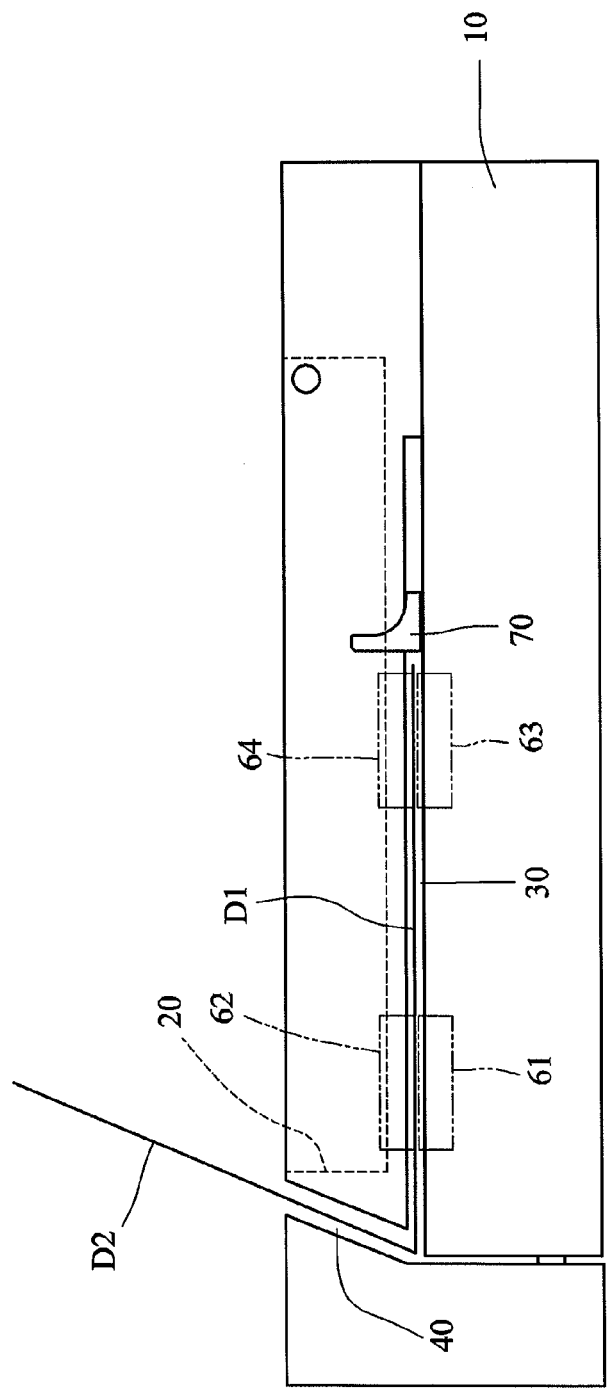
FIG. 9 shows a schematic side view of a multi-purpose scanner according to a sixth embodiment of the present invention.

FIG. 9 shows a schematic side view of a multi-purpose scanner according to a sixth embodiment of the present invention. As shown in FIG. 9, this embodiment is similar to the first embodiment except that the included angle between the first passageway 30 and the second passageway 40 is smaller than 90 degrees. Thus, the effect the same as the first embodiment may also be obtained. In addition, it is more convenient to scan the angled document, which cannot be easily opened to have an included angle of 90 degrees.

Figure 10:
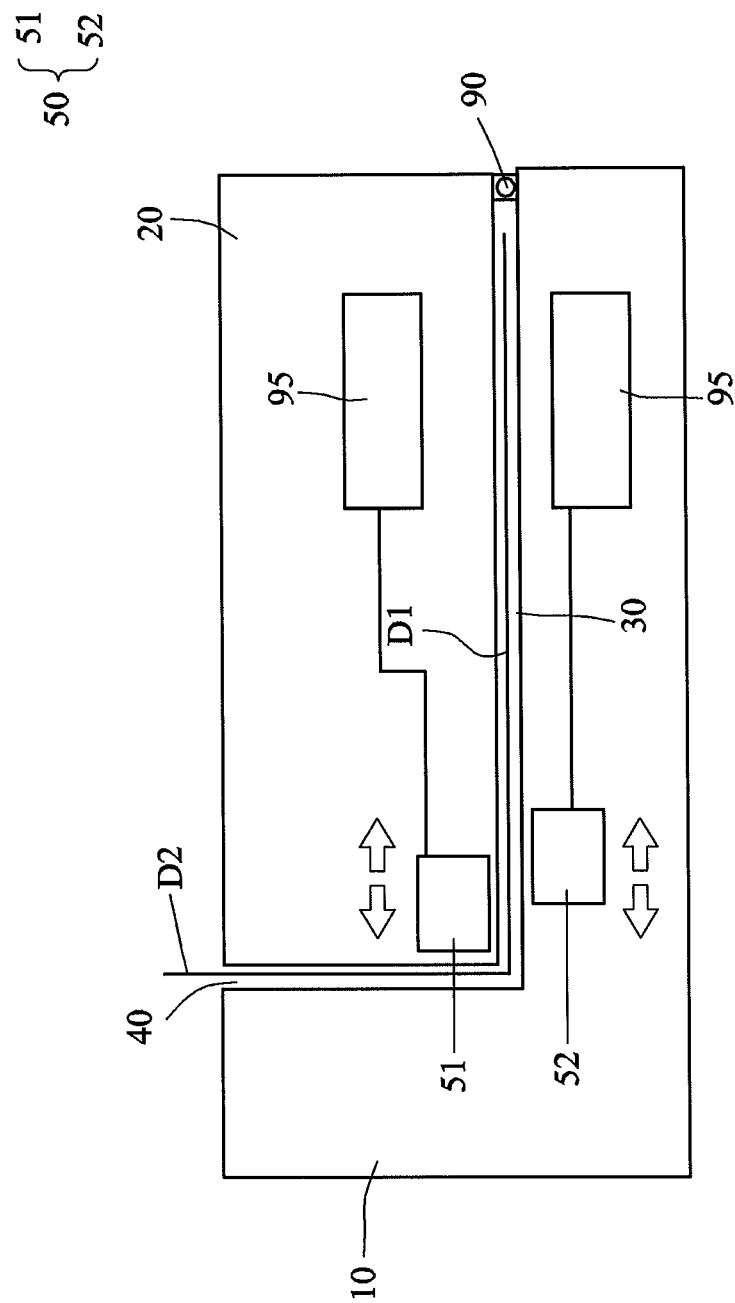
FIG. 10 shows a schematic side view of a multi-purpose scanner according to a seventh embodiment of the present invention.

FIG. 10 shows a schematic side view of a multi-purpose scanner according to a seventh embodiment of the present invention. As shown in FIG. 10, this embodiment is similar to the first embodiment except that the multi-purpose scanner of this embodiment is a flatbed scanner, wherein the multi-purpose scanner further comprises a driving mechanism 95, which is connected to the scanning module 50 and drives the scanning module 50 to move back and forth to scan the first portion D1 of the angled document D. In addition, the first scanning unit 51 and the second scanning unit 52 of the scanning module 50 are disposed in the second body 20 and the first body 10, respectively, to downwardly and upwardly scan the front side and the back side of the first portion D1 of the angled document D, respectively.

The multi-purpose scanner of each embodiment of the present invention is different from frequently seen flatbed scanners and sheet-fed scanners, can transport the bound document having two page sides with different thicknesses and perform the simplex or even duplex scan on the bound document, and can perform the simplex/duplex scan on the ordinary document. The operation is simple, timesaving, laborsaving and user friendly, the cost of purchasing different types of scanners can be saved, the space can be saved, and the multiple purposes can be obtained. In addition, it is unnecessary to flatten the bound document or the angled document or even unnecessary to deform these documents in the scan operation. The user can perform the image scan using his/her single hand to place the document. Because the scanning module can be disposed as close to the second passageway as possible, the zero margin can be obtained so that the scan range is enlarged and the scan result near the angled portion is clear. Furthermore, the limit devices are provided on left and right sides of the document, so that the scanned document can be positioned more easily, and the usage is clear and simple. In addition, when the bound document, such as passport, is scanned, the passport stands in an L-shaped manner, and the rollers transport the passport to perform the scan. This is easier and more laborsaving than turning over and flattening the passport on the scan platen. In addition, when the multi-purpose scanner is configured as a passport dedicated scanner, the overall size is smaller than that of the typical flatbed scanner, and the weight is also decreased, so that the scanner can be made portable.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A multi-purpose scanner, comprising:
   a first body;
   a second body disposed on the first body, wherein a first passageway and a second passageway, which are for accommodating a first portion and a second portion of an angled document, and are disposed on a first plane and a second plane, respectively, are formed between the first body and the second body, and an included angle is formed between the first plane and the second plane; and
   a scanning module, which is disposed on one or both of the first body and the second body, and performs an image scan operation on the first portion of the angled document in the first passageway to obtain an image signal.

2. The multi-purpose scanner according to claim 1, further comprising:
   a transporting mechanism, disposed in the first body and the second body, for transporting the angled document past the first passageway, wherein the second passageway assists in positioning the angled document.

3. The multi-purpose scanner according to claim 2, wherein the scanning module is disposed in the second body and downwardly scans the first portion of the angled document.

4. The multi-purpose scanner according to claim 2, wherein the scanning module is disposed in the second body and the first body, and downwardly and upwardly scans a front side and a back side of the first portion of the angled document.

5. The multi-purpose scanner according to claim 2, wherein the scanning module is disposed in the second body, and comprises a visible light scanning unit and an infrared or ultra-violet light scanning unit for downwardly scanning the first portion of the angled document to obtain a visible light image and an infrared or ultra-violet light image.

6. The multi-purpose scanner according to claim 5, further comprising a control module, which is electrically connected to the visible light scanning unit and the infrared or ultra-violet light scanning unit, and controls the visible light scanning unit and the infrared or ultra-violet light scanning unit to scan the first portion of the angled document.

7. The multi-purpose scanner according to claim 5, further comprising a control module, which is electrically connected to the visible light scanning unit, the infrared or ultra-violet light scanning unit and the transporting mechanism, and controls the visible light scanning unit and the infrared or ultra-violet light scanning unit to scan the first portion of the angled document, transported by the transporting mechanism in reverse directions, respectively.

8. The multi-purpose scanner according to claim 2, further comprising an adjustable guide plate, connected to the first passageway, for pressing the first portion of the angled document against the second passageway.

9. The multi-purpose scanner according to claim 2, further comprising a thickness adjusting mechanism, connected to a first portion and a second portion of the first body, for adjusting a thickness of the second passageway to fit with a thickness of the second portion of the angled document.

10. The multi-purpose scanner according to claim 1, further comprising a pivotally connecting mechanism pivotally connecting the second body to the first body.

11. The multi-purpose scanner according to claim 1, further comprising:
a driving mechanism, connected to the scanning module, for driving the scanning module to move back and forth to scan the first portion of the angled document.

12. The multi-purpose scanner according to claim 11, wherein the scanning module is disposed in the second body and the first body and downwardly and upwardly scans a front side and a back side of the first portion of the angled document, respectively.

13. The multi-purpose scanner according to claim 1, wherein the included angle is greater than or equal to 10 degrees and smaller than 180 degrees.

14. The multi-purpose scanner according to claim 1, wherein the included angle is greater than or equal to 10 degrees and smaller than 170 degrees.

15. The multi-purpose scanner according to claim 1, wherein the included angle is greater than or equal to 20 degrees and smaller than 160 degrees.

16. The multi-purpose scanner according to claim 1, wherein the included angle is greater than or equal to 10 degrees and smaller than 90 degrees.

17. The multi-purpose scanner according to claim 1, wherein the included angle is greater than or equal to 90 degrees and smaller than 180 degrees.

18. The multi-purpose scanner according to claim 1, wherein the included angle is substantially equal to 90 degrees.

* * * * *